United States Patent
Plunkett

[11] 3,899,725
[45] Aug. 12, 1975

[54] BRAKING EFFORT CONTROL

[75] Inventor: Allan B. Plunkett, Lawrence Park, Pa.

[73] Assignee: General Electric Company, Erie, Pa.

[22] Filed: Feb. 25, 1974

[21] Appl. No.: 436,341

[52] U.S. Cl............................ 318/227; 318/366
[51] Int. Cl. ........................................... H02p 5/40
[58] Field of Search..... 318/227, 230, 231, 364–369

[56] References Cited
UNITED STATES PATENTS

| | | | |
|---|---|---|---|
| 3,769,564 | 10/1973 | Rettig | 318/227 |
| 3,775,651 | 11/1973 | Graf et al. | 318/227 |
| 3,781,614 | 12/1973 | Mokrytzki et al. | 318/227 |
| 3,824,437 | 7/1974 | Blaschke | 318/227 |

*Primary Examiner*—Robert K. Schaefer
*Assistant Examiner*—W. E. Duncanson, Jr.
*Attorney, Agent, or Firm*—Dana F. Bigelow

[57] ABSTRACT

During the electric braking of an inverter powered propulsion vehicle, it is desirable that the constant torque performance characteristics be extended to a speed beyond that for which pulse width modulation can be effectively used to control voltage. This extension is accomplished by compensating the current command signal, and thus the motor current, by an amount proportional to the speed of the vehicle and inversely proportional to the inverter d-c voltage during periods of operation above the pulse width modulated speeds. A comparator is provided to select the higher of either the uncompensated or compensated current commands, thereby allowing the current command signal to be unaffected during pulse width modulation modes and to be automatically compensated at speeds thereabove.

21 Claims, 7 Drawing Figures

BRAKING EFFORT CONTROL

BACKGROUND OF THE INVENTION

This invention relates generally to motor control circuits and more particularly to the regulation of torque output from an electric brake system.

Electric drive vehicles such as transit cars typically have requirements for initially accelerating at a maximum rate, running a short distance, and then braking at a maximum rate. The intermediate portion of the cycle is best facilitated by a constant horsepower mode of operation wherein the motor voltage and current are inversely proportional to speed. The acceleration and deceleration portions of the cycle are best brought about by the application of high levels of torque. Thus a typical performance curve for a vehicle being propelled from a standstill to a maximum allowable speed calls for a maximum constant torque to a first speed, a constant horsepower application to a second speed, and then a series motor characteristic, wherein the power drops off in an inverse relationship to the speed.

In an inverter powered system these three modes of operation can be obtained by varying the voltage during mode 1, varying the motor slip during mode 2, and holding these quantities constant during mode 3.

During mode 1 the torque may be regulated at a high constant level by varying the motor voltage in relation to the speed as shown and described in copending patent application Ser. No. 402,253, entitled, Method and Apparatus for IR Compensation, filed on Oct. 1, 1973, in the name of Allan B. Plunkett.

In the braking phase of operation it is desirable to accomplish as much of the required braking as possible by electrically braking, either dynamically or regeneratively. Further, it is desirable to apply the maximum degree of braking effort at higher speeds. To accomplish this it is necessary that greater torques be developed at the higher speeds, or expressed in another way, that the performance characteristics are such that the constant torque mode is extended to accommodate higher speeds than those accommodated in the motoring modes. This is partially facilitated by the extension of the pulse width modulation range to higher speeds, which follows from increased inverter d-c voltage as is indicated by the copending patent application Ser. No. 436,340 entitled "Regenerative Braking Circuit," filed concurrently herewith in the name of the present inventor and assigned to the assignee of the present invention. However, this extension is still not sufficient to provide the required braking capability.

Other problem areas that are associated with electrical braking are the transition between dynamic and regenerative braking and variance in line voltages. When a change is made from the dynamic mode to the regenerative mode, or vice versa, the voltage across the inverter changes and therefore the torque changes. Switching between regenerative and dynamic braking will become increasingly severe as speed decreases since the d-c inverter voltage approaches line voltage at zero speed for regeneration but 0 volts at zero speed for dynamic braking. Similarly, a variance in the line voltage causes a change in the torque level to either higher or lower than that of the desired constant torque level.

It is therefore an object of this invention to provide for constant braking torque through a higher speed range.

Another object of this invention is the provision for a constant torque braking effort in the square wave mode of operation of a pulse width modulated inverter system.

Yet another object of this invention is the provision for a system which is automatically brought into use when the mode of operation passes from pulse width modulation to square wave operation.

A further object of this invention is the provision for maintaining a desired regenerative braking effort when line voltage changes occur.

Still another object of this invention is the provision for smooth transitions when changing between dynamic and regenerative types of braking.

Yet another object of this invention is the provision for a control circuit which is economical to produce and effective in use.

These objects and other features and advantages become more readily apparent upon reference to the following description when taken in conjunction with the appended drawings.

SUMMARY OF THE INVENTION

Briefly in accordance with one aspect of the invention, the current call signal, which represents the desired motor current, is compensated in the square wave mode of operation to reflect changes in speed and line voltages. Thus the constant torque operating range is increased to a desired higher level during braking, and changes in inverter voltages, due both to the transition between dynamic and regenerative braking, and to the variances in the line voltage, are compensated for.

Since voltage control is no longer maintained in the square wave mode of operation, torque control is accomplished by adjusting the current call signal by a factor having the vehicle speed as its numerator and the inverter d-c voltage as its denominator. To accomodate the automatic application of the compensation factor when the transition is made to square wave operation, a comparison is made of the compensated and uncompensated current call signals, with only the higher one being utilized as the applied signal. Therefore the compensated signal only comes into effective use during square wave operation.

During square wave operation motor voltage can no longer be varied in proportion to the speed, so instead the motor current is modulated to obtain the desired constant torque characteristics. In this way an ancillary benefit is obtained in that changes of inverter dc voltages caused by line voltage changes and by the transition between dynamic and regenerative braking, are compensated for by associated changes in motor current.

In the drawings as hereinafter described, a preferred embodiment is depicted; however, various other modifications can be made thereto without departing from the true spirit and scope of the invention.

3

Figure 4:
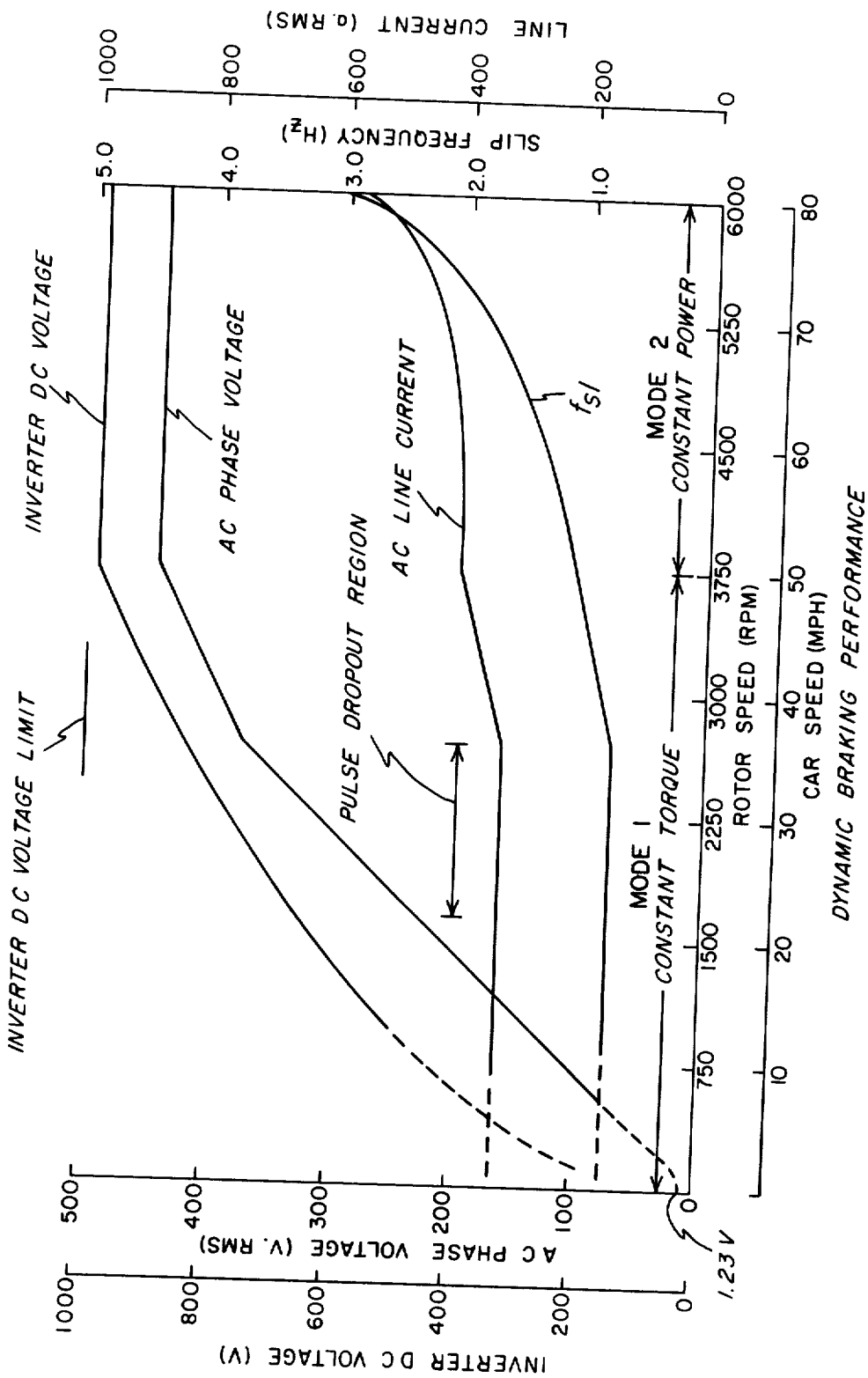

FIG. 4 shows a graphic illustration of typical system characteristic during dynamic braking over the speed range of a vehicle.

Figure 5:
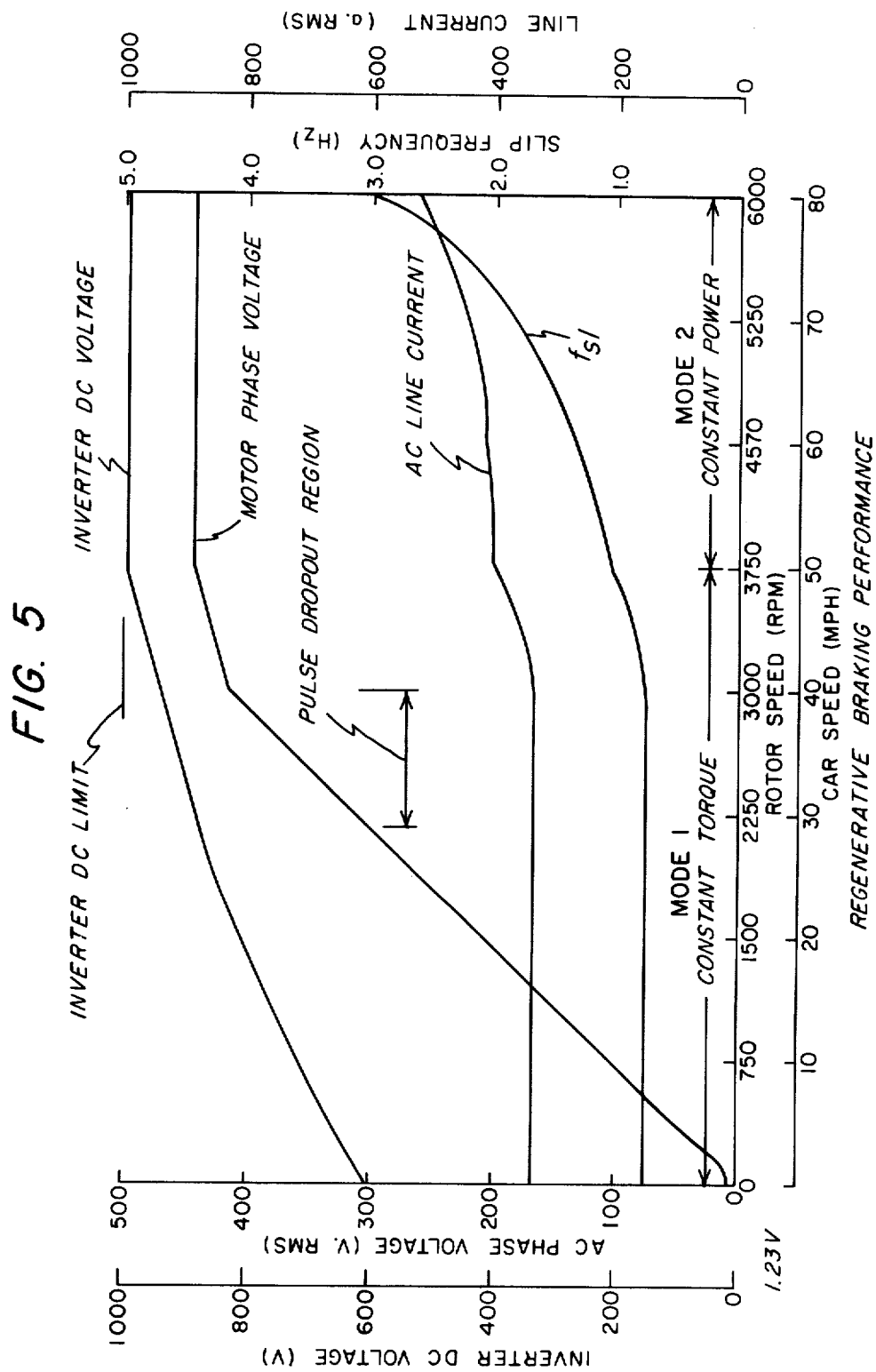

FIG. 5 shows a graphic illustration thereof during regenerative braking.

Figure 6:
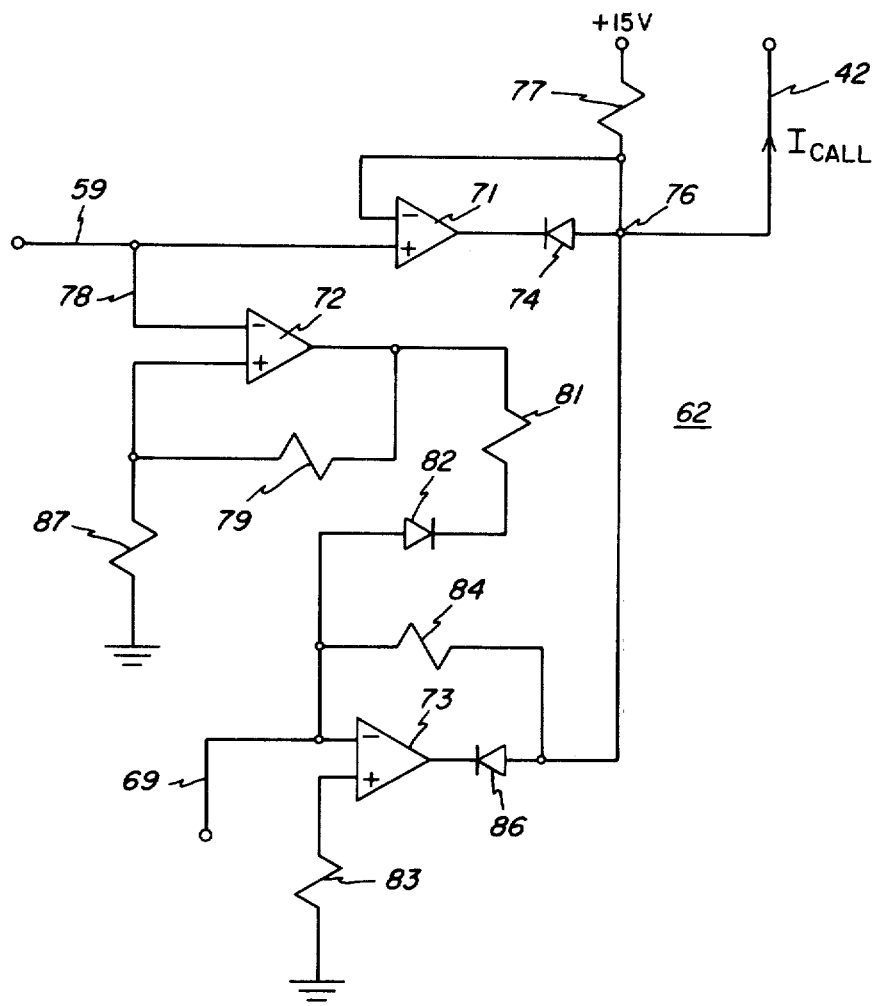

FIG. 6 is an electrical schematic diagram of the comparator portion of the preferred embodiment of the invention.

Figure 7:
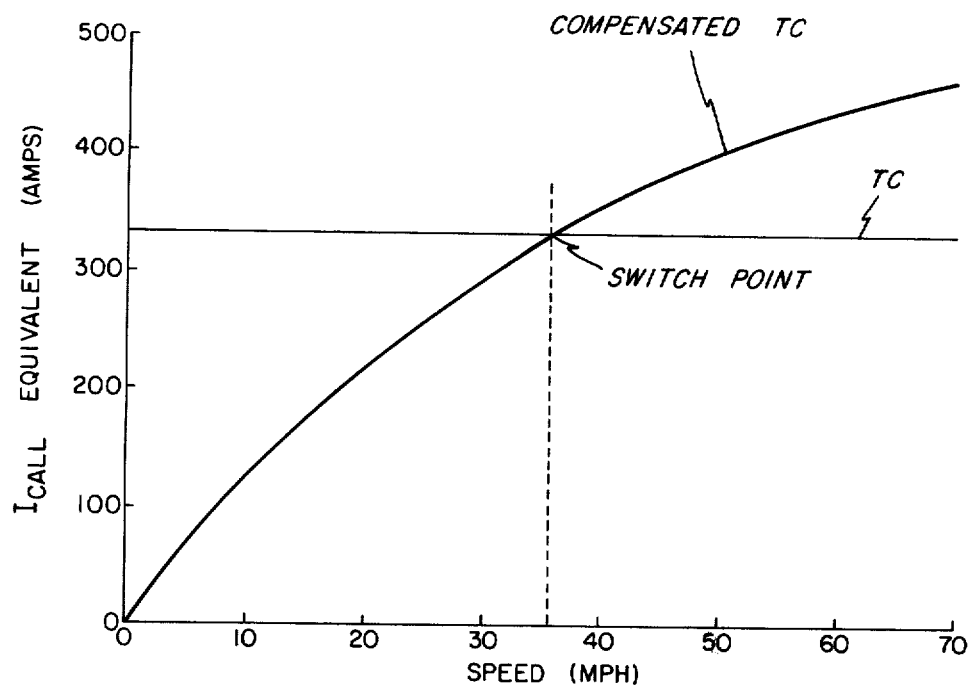

FIG. 7 shows the typical variation of TC and the compensated TC as a function of speed for the dynamic braking case.

DESCRIPTION OF THE PREFERRED EMBODIMENT

Figure 1:
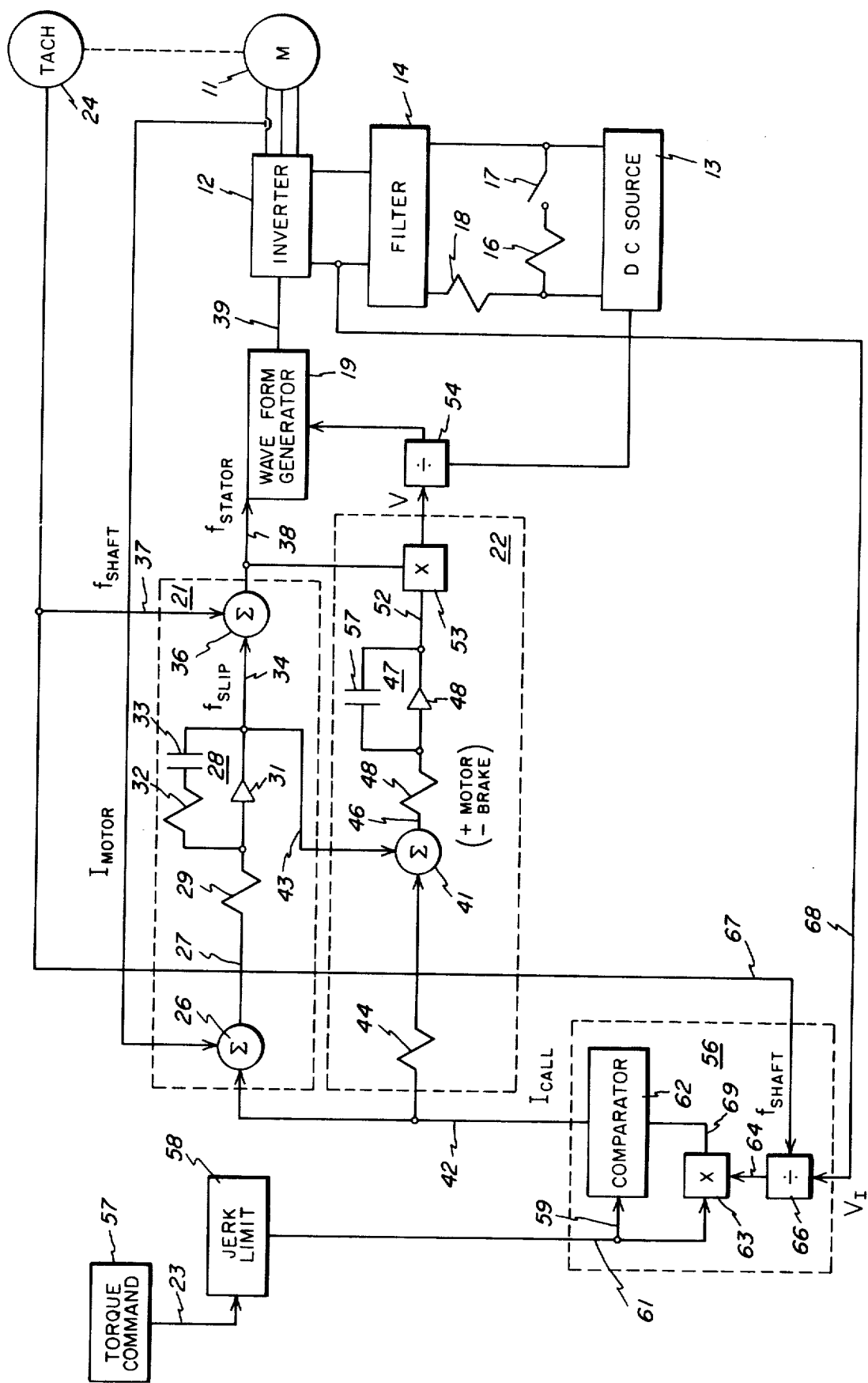
FIG. 1 is a schematic circuitry diagram of the preferred embodiment of the invention.

Referring now to FIG. 1, an inverter control system is illustrated wherein an a-c induction motor 11 is connected to receive a-c power from a three phase inverter 12 during motoring operation and to deliver a-c power thereto during periods of electrical braking. The inverter 12 which is cinnected to a d-c source 13 through a low pass filter 14, generally comprises a circuit for converting d-c power to a-c power, and may be one of any of the various types shown and described in Principles of Inverter Circuits, Bedford and Hoft, John Wiley & Sons Inc., 1964, but the impulse-commutated type (McMurray) is the preferred type.

The d-c power source 13 is typically a third rail fed from substations supplying substantially constant d-c voltage with variable transients. The line filter 12 is utilized to minimize interference with any signalling system and to supply the reactive power required for ac induction motor excitation. Electrical retardation is accomplished by dynamic braking and/or regenerative braking, the former being affected by the braking resistors 16 and 18 and contactor 17, and the latter being accommodated by the series resistor 18, both as shown and described in copending patent application entitled Regenerative Braking Circuit referenced hereinbefore.

It should be understood that this invention is also applicable for use with a cycloconverter operating from an a-c source. In such a circuit the d-c power source 13, filter 14 and inverter 12 are replaced by an a-c source and a cycloconverter, with the remaining portion of the circuit operating in a manner substantially the same as with the inverter.

The inverter 12 utilizes solid state components to produce variable frequency, variable voltage, three phase power from the d-c source to supply the motor 11 for variable speed operation. In order to obtain the desired torque output values as well as compensate for line voltage changes, load changes, and voltage drop in the cables, inverter and line filter, it is necessary to vary the voltages, the frequencies or both. Control of the inverter to obtain the desired frequency and voltage is thus established by a waveform generator 19 having inputs of desired frequency $f_{stator}$ from a frequency control circuit 21, and a desired voltage V from the voltage control circuit 22, as shown and described in copending control circuit 22, as shown and described in copending application Ser. No. 402,253 (Method and Apparatus for Automatic IR Compensation) referenced hereabove.

One of the input into each of the frequency control circuit 21 and the voltage control circuit 22 is the call current signal $I_{call}$. This d-c signal is representative of the desired motor current and therefore the desired torque developed at the motor. It is obtained by modifying a torque command signal 23 in a manner to be more fully described hereinafter. The $I_{call}$ is a positive signal when operating in a motoring mode and a negative signal when operating in a braking mode.

Other input signals into the frequency control circuit include a d-c feedback signal $I_{motor}$, which is a representative signal received from the motor, and the shaft frequency, $f_{shaft}$, which is fed back from the motor through the tachometer 24.

Referring more specifically to the frequency control circuit 21, the desired motor current signal $I_{call}$ and the actual motor current signal $I_{motor}$ are d-c signals which are compared in an adder 26 with the difference being sent along line 27 to the integrator 28. The integrator 28, with input resistor 29, ooperational amplifier 31 and feedback elements, resistor 32 and capacitor 33, adjusts the slip to the value required for the desired motor current and hence torque. The desired slip frequency $f_{slip}$ is impressed on line 34 as a positive signal when operation in the motoring mode and as a negative signal when in the braking mode of operation. In the integrator 28, the loop compensation is of the form (S+W)/S. The pole at the origin gives a zero steady state error and the zero (S+W) allows a faster loop response for a given damping ratio.

The terminal frequency of the a-c induction motor is set by the adder 36, preferably of the digital type, which addes the input signals of the desired slip frequency $f_{slip}$, and the actual shaft frequency $f_{shaft}$, which is taken in along line 37. The desired motor line frequency signal, $f_{stator}$, is thus derived by reading the shaft speed and adding (for motoring) or subtracting (for braking) the desired slip frequency $f_{slip}$ from the shaft frequency $f_{shaft}$. This function is accomplished digitally due to the high accuracy requirement. The frequency signal $f_{stator}$ is then passed along line 38 to the waveform generator 19 whose ouptut is responsively sent along line 39 to control the inverter 12.

Having established a signal to control the frequency of the power to the induction motor we now turn to the voltage control circuit 22 whose function it is to produce a corresponding voltage signal V, for the waveform generator to control the line voltage to the motor. The voltage is generally controlled at low speeds by pulse width modulation in response to the output of the voltage control circuit 22. The desired relationship is maintained by varying the voltage in proportion with the motor line frequency, $f_{stator}$ so as to maintain a constant flux value. Resistance losses are compensated for in a manner more fully described in copending U.S. Pat. Ser. No. 402,253 referenced hereinbefore.

Referring now to the voltage control circuit 22 a summer 41 receives desired motor current signals $I_{call}$ from line 42 and the desired slip frequency signal $f_{slip}$ along line 43. The $I_{call}$ signal on line 42 is modified by a proportionality constant in the form of a gain resistor 44 to obtain the desired linear relationship between $f_{slip}$ and $I_{call}$. A comparision is made and the difference signal is transmitted along line 46 to the integrator 47, having input resistor 48, operational amplifier 49, and a feedback loop with capacitor 51. Again the loop compensation used is of a form K/S for zero steady state error. A flux signal is then transmitted along line 52 to a multiplier 53 where it is multiplied by the line frequency $f_{stator}$, to obtain the motor voltage value V whose signal is received by the waveform generator 19. The multiplier 53 is generally of a known type, as for example, a time divisional or quarter square multiplier type as shown and described in "Analog Computation," Albert Jackson, McGraw-Hill, 1960. The preferred multiplier is that of the transconductance type. The multiplier 48 allows the circuit to maintain a constant loop gain as speed varies. This is not a necessary component for the operation of the voltage regulation circuit, but improves the operation considerably.

A divider 54 is added to the inverter voltage control loop to instantaneously compensate for d-c line voltage changes while operating in the PWM mode of operation. The a-c voltage applied to the motor is the product of the voltage signal, V, and the d-c line voltage. Thus, the divider 54 is used to divide the voltage control signal by the d-c line voltage to keep the a-c motor voltage constant. The divider can be inserted either ahead of or following the multiplier as shown. The divider 54 is of a standard type which operates on the principles described in "Analog Computation" referenced hereinbefore.

Figure 2:
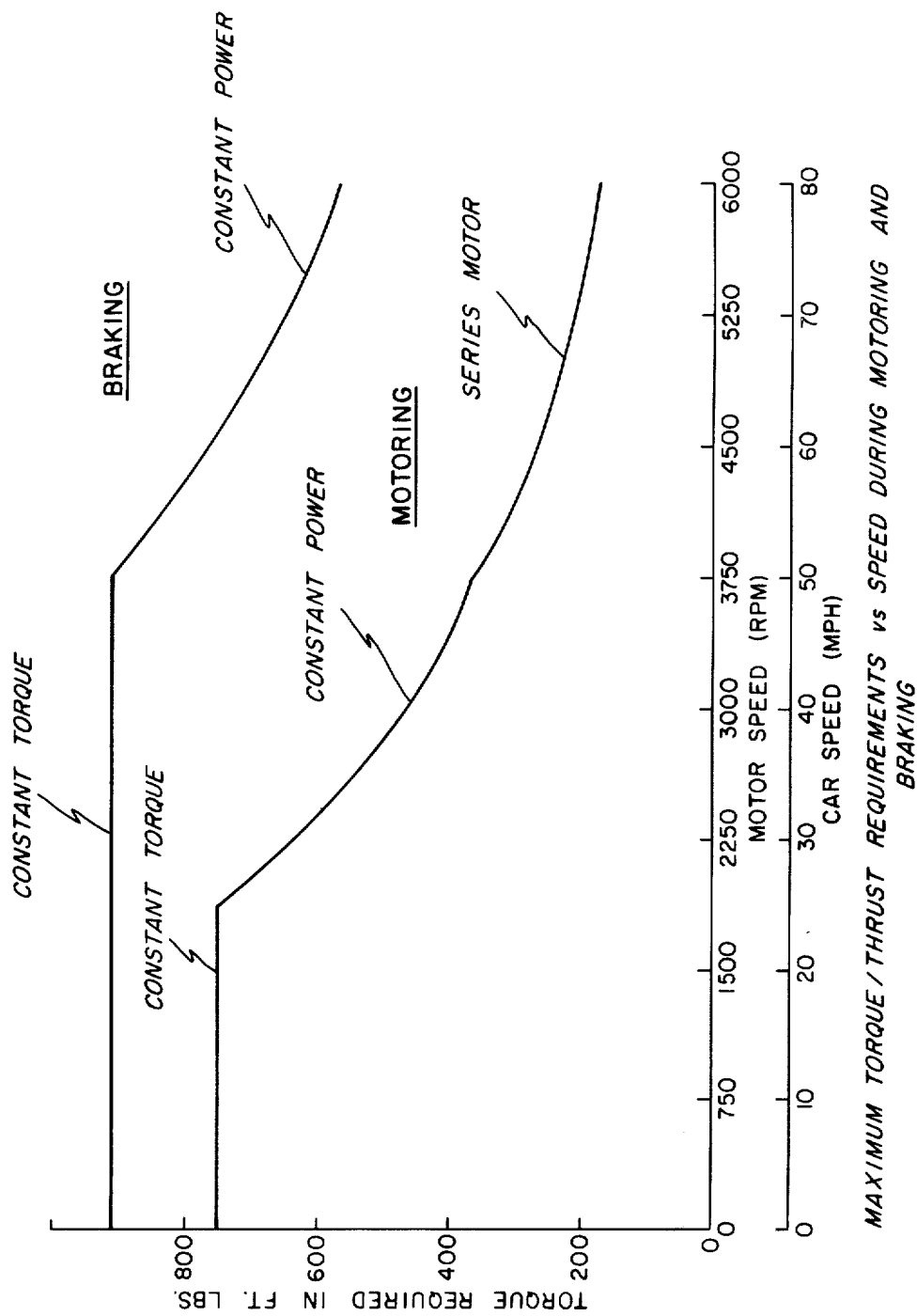
FIG. 2 is a graphic illustration of torque requirements vs speed during motoring and braking of a car.
Figure 3:
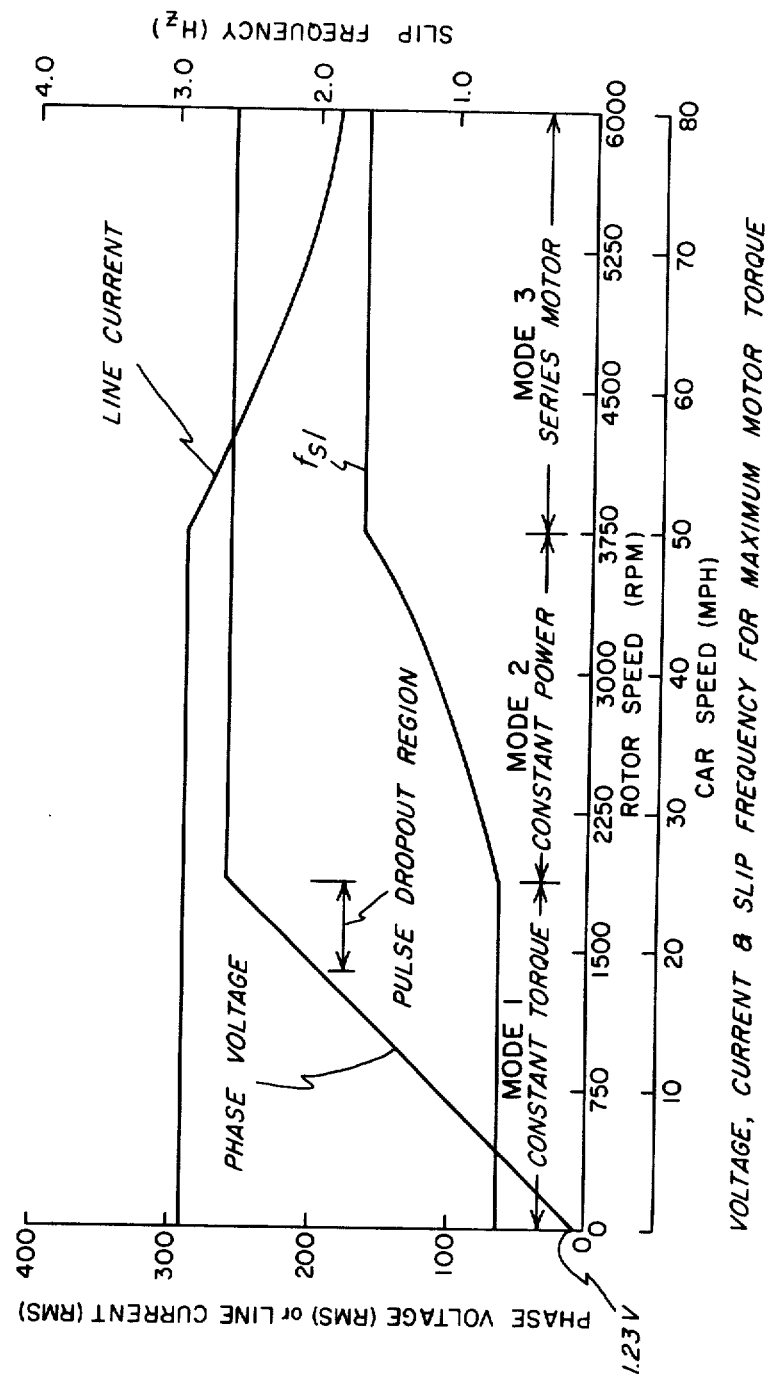
FIG. 3 shows a graphic illustration of desirable system characteristic for motoring over the speed range of a vehicle.

Referring now to FIGS. 2 and 3, the torque requirements, along with the associated voltage, current, and slip frequencies, are shown for the motoring modes of operation wherein during the first mode, (from 0 – 25 mph) a constant torque output is maintained by modulation of the voltage in direct proprotion to the speed with the voltage control circuit 22 just described. During a second stage of motoring operation (typically 25 – 50 mph) the voltage feedback loop is saturated and the a-c voltage has reached the maximum value corresponding to the d-c line voltage, and is the maintained at a substantially constant value thereafter (see FIG. 3). Since it is desirable to have a constant horsepower characteristic within this range, the motor slip, $f_{slip}$, is modulated to hold teh current at a constant value and thereby bring about a constant horsepower characteristic. During this stage of operation the $f_{slip}$ is proportional to speed and the torque is inversely proportional thereto. In a third phase of operation (50 – 80 mph) the $f_{slip}$ has reached a point near the motor pullout frequency and is thereafter held constant. The current will then decrease as the inverse of speed, and torque will decrease as the inverse of the speed squared.

Referring back to FIG. 2, it is seen that the torque requirements for braking are higher than those for motoring. Not only is the torque level higher, but also the range of constant torque operation is considerably extended (i.e., 50 mph vice 25 mph). Since the commutating ability of an inverter is greater in braking than in motoring the range at which the voltage can be modulated is extended when operating in the braking modes, as can be seen by reference to FIGS. 4 and 5, yet cannot be extended to the required corner point of 50 mph shown in FIG. 2. The extension of the constant torque characteristics to approximately 36 mph in the dynamic braking mode (FIG. 4) is brought about by the fact that the inverter d-c voltage increases with speed, because of the braking resistor 16 in the circuit, thus permitting the range of pulse width modulation to be extended to that speed. As can be seen in FIG. 4 the a-c line current and motor slip frequency remain constant within that range, and the a-c phase voltage maintains its linear relationship with speed thereby providing a constant torque output. Similarly, in the case of regenerative braking (FIG. 5), the pulse width modulation range is extended to 40 mph, and the motor phase voltage is thus capable of control to that speed to bring about constant torque performance. The higher range of the regenerative braking mode is made possible by the series resistor 18 which raised the inverter d-c voltage.

Since in both dynamic and regenerative braking modes pulse width modulation and thus direct line voltage control is lost, another variable must be provided to accommodate the extension of constant torque performance to 50 mph. This can be accomplished by increasing the current command signal $I_{call}$ to compensate for the loss in volts/hz as will be more fully explained hereinafter.

It is well known that the torque vs speed curve for an induction motor may be approximated by a straight line over the normal operation range. The approximate equations which apply over any of the modes of operation are $$T \cong K_T \frac{(V_1)^2}{f_e} f_{sr}$$

and $$i_1 \cong K_I \frac{(V_1)}{f_e} f_{sr}$$

where
 T=torque
 $i_1$=a-c line current=$I_{call}$
 $K_T$=constant
 $K_I$=constant
 $V_1$=fundamental motor phase voltage
 $f_e$=line frequency=f stator
 $f_{sr}$=slip frequency=F slip
by substitution:

$$T = \frac{K_T}{K_I} \left(\frac{V_1}{f_e}\right) i_1$$

As can be seen in FIGS. 4 and 5, during square wave operation the motor phase voltage $V_1$ is proportional to the inverter d-c voltage $V_I$.

Therefore, if $i_1$ is adjusted such that $$i_1 = \frac{K_I T f_e}{V_I} = I_{call}$$

then constant torque operation can be extended to the square wave range of operation. Since $V_I$ increases as the square root of speed, it is clear that the current command signal $I_{call}$ also changes by this factor.

Shown in FIG. 1 is a compensating circuit 56 which charges the current call signal $I_{call}$ during braking modes of operation in the pulse width modulation range. A torque command module 57 is selectively adjusted to provide a torque command signal 23 representative of the desired motor torque to be applied for either motoring or braking. A jerk limit circuit represented by the block 58 may be included to automatically limit the rate of change of the torque command signal to a value consistent with passenger comfort (e.g., 3 mph/sec$^2$). The modified torque command signal TC is then received by the compensating circuit 56 where it is conducted along two lines 59 and 61, the lines leading to a comparator 62 and a multiplier 63, respectively. Also leading into the multiplier 63 is an output line 64 from a divider 66 having inputs of shaft frequency, $f_{shaft}$, and inverter d-c voltage, $V_I$, along lines 67 and 68, respectively. The multiplier 63 and divider 64 are generally of a known type, as for example as shown and described in "Analog Computation," Albert Jackson, McGray-Hill, 1960.

In operation the shaft frequency signal, $f_{shaft}$, is divided by the inverter d-c voltage signal $V_I$ and the result is applied by the multiplier 63 to the torque command signal, TC. The product is then sent along line 69 to the comparator 62 which selects the most negative of the two input signals for the current command signal $I_{call}$. A more detailed understanding of the comparator 62 can be had by reference to FIG. 6. This circuit functions to compare the negative torque command signal from line 59 with the compensated signal-$TC \times f_{shaft}/V_I$ from the 69 during retarding modes of operation. During motoring, the circuit is effectively removed and the positive torque command signal passes uncompensated to line 42 as the I $_{call}$ signal.

The circuit comprises differential operational amplifiers 71, 72, and 73 with the latter two connected in the inverting mode of operation. The operational amplifier 71 has as its input signal from line 59 the torque command signal, and has its output connected to the cathode of a diode 74 leading to terminal 76 and line 42. A dc potential + 15v is connected to terminal 76 through a resistor 77. On the input side of amplifier 71, a line 78 carries the torque command signal from line 59 to the input of operational amplifier 72 having feedback resistances 79 and 87 and output resistance 81. The resistors 79 and 87 provide hysteresis for the comparison amplifier 72 to prevent oscillation. The amplifier 72 detects a motoring signal (positive) on line 59. A diode 82 and resistor 81 are connected between the output of amplifier 72 and the input of amplifier 73. The diode's function is to block the positive signal amplifier 72 from and allow the amplifier 73 to receive only the signal from line 69 when operating in the braking mode of operation, (negative on line 59). The diode 82 and resistor 81 apply a large negative signal when line 59 is positive (motoring) to amplifier 73 to override the input on line 69 and cause the output of amplifier 73 to become saturated in the positive direction and cut off diode 86.

Also connected to the input of amplifier 73 is line 69 which carries the compensated signal $TC \times f_{shaft}/V_I$. Amplifier 73 noninverting input is grounded through resistor 83 and has a feedback resistor 84. Its output is connected to the cathode of a diode 86 whose anode is connected to the terminal 76.

In operation, the diodes 74 and 86 act to apply the most negative of the two signals from amplifiers 71 and 73 to the terminal 76. During motoring, the positive signal from line 59 is inverted in both amplifier 72 and applied to amplifier 73 with a high gain through a diode 82, so that diode 86 blocks the signal and removes the compensating portion of the circuit. The positive torque command signal then becomes the $I_{call}$ signal through amplifier 71 and diode 74. During braking, line 59 is negative, the output of amplifier 72 is positive thus causing diode 82 to be cut off. if line 69 is more positive than line 59 is negative, diode 86 will assume conduction thus connecting the compensated signal to the $I_{call}$ output on line 42. A smooth transition between pulse width modulation and square wave operation will always occur since at that point both signals will be nearly the same value. The transition is always assured because of the use of inverter dc voltage instead of ac voltage in the compensation circuit. Since in PWM operation, the ac voltage always becomes less than the equivalent dc voltage the output of the compensation circuit will be less than the TC signal for low speeds when in PWM operations. FIG. 7 illustrates the variation of TC and the compensated TC as a function of speed. The point of intersection (switch point) is the boundary between PWM and square wave inverter operation. Therefore, there exists in the circuit no requirement for actual knowledge of either square wave or pulse width modulation operating modes, as the torque per amp of the motor will always be maximum in the pulse width modulation operation. Hence, the current command signal $I_{call}$ is set to override the nominal command signal only during braking.

Referring again to FIG. 4, the motor characteristics show dynamic braking at constant volts/hz until 36 mph where the voltage control is then lost and the a-c amplitude follows the form of the a-c inverter voltage. Within this range slip frequency, $f_{se}$, and hence line current must be increased with speed to maintain constant torque. At 50 mph, the voltage amplitude is regulated constant and constant power operation begins with the slip frequency eventually reaching the value corresponding to breakdown torque at 80 mph. Since the power dissipation requirements of the braking resistors 16 decrease linearly to zero at zero speed, the d-c inverter voltage decreases to zero on a square root characteristic. Due to inverter commutation difficulties it is clear that dynamic braking is not possible below some minimum speed, (e.g., 15 mph). The theoretical curves are extended to zero by dashed lines.

Similarly, FIG. 5 shows the motor characteristics during regenerative braking, wherein constant volts/hz operation now occurs from 0 to 40 mph. Again the inverter is in square wave operation above 40 mph, and the a-c voltage amplitude follows the d-c inverter voltage characteristic.

Typically, the system will initiate braking in the regeneration mode with a maximum line voltage limit. If the line receptivity is poor, friction braking will be blended to hold and d-c line voltage to the maximum allowable value. When the desired percentage of friction brake rate is exceeded, the system will switch to dynamic braking. Subsequently, when the low speed limit (about 15 mph) for dynamic braking is reached, the system will return to regenerative braking for the final stop.

When changes occur in the line voltages (d-c source) during regenerative braking, and when motor voltages suddenly change during transitions between dynamic and regenerative braking, the current is automatically changed in the opposite direction to maintain the desired braking torque.

What I claim as new and desire to secure by Letters Patent of the United States is:

1. An improved control circuit for an inverter which is suitable for interconnecting a d-c power source and an a-c motor load, the a-c motor being adapted to deliver power to the inverter during periods of electrical braking and the inverter being operative in a square wave mode when the speed of said motor is above a predetermined value, wherein the improvement comprises:

a. means for generating a current command signal representative of the desired motor current;
b. means for modulating said current command signal in response both to the motor speed and to changes in the motor voltage; and
c. means responsive to the modulated command signal for controlling the operation of said inverter so as to control the motor current during periods of electrical braking and to maintain a constant torque output whenever the motor speed is above said predetermined value.

2. An improved inverter control circuit as set forth in claim 1 wherein said current command signal is increased as the square root of motor speed.

3. An improved control circuit for an inverter which is suitable for interconnecting a d-c power source and an a-c motor load, the a-c motor being adapted to deliver power to the inverter during periods of electrical braking, wherein the improvement comprises:
a. means for generating a current command signal representative of the desired motor current;
b. means for compensating said current command signal by a factor proportional to the motor stator frequency and inversely proportional to the motor a-c voltage;
c. means for deriving a modulated command signal comprising the higher of said current command signal and the compensated signal; and
d. means responsive to said modulated command signal for controlling the operation of said inverter so as to control the current output of said motor during periods of electrical braking.

4. An improved inverter control circuit as set forth in claim 3 wherein said compensating means receives an input signal representative of the d-c inverter voltage and proportional to the motor a-c voltage.

5. An improved inverter control circuit as set forth in claim 3 wherein said compensating means receives an input signal representative of the motor speed and proportional to the motor stator frequency.

6. An improved inverter control circuit as set forth in claim 3 wherein said inverter is of the pulse width modulated type and further wherein said compensated signal is higher than said command signal only when said inverter is operating in a square wave mode of operation.

7. An improved control circuit as set forth in claim 3 wherein said modulated command signal deriving means comprises a pair of parallel input diodes connected to a common output terminal.

8. An improved torque control circuit of the type having an a-c motor, a d-c power source, an inverter and an inverter control circuit responsive to a current command signal representative of the desired motor stator current, wherein the improvement comprises:
a. means for generating a tractive effort command signal;
b. means for compensating said command signal by a factor proportional to the motor stator frequency and inversely proportional to the motor a-c voltage;
c. means for selecting the higher of said command signal and said compensating signal for use as the current command signal.

9. An improved control circuit as set forth in claim 8 wherein said inverter operates in a square wave mode above a first predetermined motor speed and further wherein said current command signal is increased to maintain a constant torque output for motor speeds above said first predetermined motor speed.

10. An improved control circuit as set forth in claim 9 wherein said current command signal is increased as the square root of motor speed.

11. An improved control circuit as set forth in claim 8 wherein said compensating means receives an input signal representative of the d-c inverter voltage and proportional to the motor a-c voltage.

12. An improved control circuit as set forth in claim 8 wherein said compensating means receives an input signal representative of the rotor frequency and proportional to the motor stator frequency.

13. An improved control circuit as set forth in claim 8 wherein said inverter is of the pulse width modulated type and further wherein said compensated signal is higher than said command signal only when said inverter is operating in the square wave mode of operation.

14. an improved control circuit as set forth in claim 8 wherein said selecting means comprises a pair of parallel input diodes connected to a common output terminal.

15. An improved power circuit of the type having an inverter for connection to a d-c power source and an a-c motor, the a-c motor being adapted to deliver power to the inverter during periods of electrical braking, wherein the improvement comprises:
a. means for generating a braking effort command signal representative of the desired braking torque to be applied by the motor;
b. means for compensating said command signal by a factor proportional to the motor stator frequency and inversely proportional to the motor a-c voltage;
c. means for selecting the higher of said command signal and said compensated signal to obtain a current command signal, representative of the desired motor current; and
d. an inverter control circuit responsive to said current command signal to control the inverter and thus the torque output of the motor.

16. An improved power circuit as set forth in claim 15 wherein the motor torque output is maintained as a constant value up to a predetermined speed by modulation of said current command signal and thus the motor current.

17. An improved power circuit as set forth in claim 16 wherein said current command signal is increased as the square root of motor speed.

18. An improved power circuit as set forth in claim 15 wherein said compensating means receives an input signal representative of the rotor frequency and proportional to the stator frequency.

19. An improved power circuit as set forth in claim 15 wherein said compensating means receives an input signal representative of the d-c inverter voltage and proportional to the motor a-c voltage.

20. An improved control circuit as set forth in claim 15 wherein said inverter is operated in a pulse width modulated mode up to a first predetermined motor speed and in a square wave mode thereafter, and further wherein said compensated signal is higher than said command signal only when the inverter is operating in the square wave mode of operation.

21. An improved power circuit as set forth in claim 15 wherein said selecting means comprises a pair of parallel input diodes connected to a common output terminal.

* * * * *